United States Patent Office 3,524,837
Patented Aug. 18, 1970

3,524,837
NOVEL BENZIMIDAZOLE POLYMERS
Harold H. Levine, La Jolla, and Martin B. Sheratte, San Diego, Calif., assignors to Whittaker Corporation, Los Angeles, Calif., a corporation of California
No Drawing. Filed May 15, 1967, Ser. No. 638,596
Int. Cl. C08g 33/02
U.S. Cl. 260—78                          7 Claims

ABSTRACT OF THE DISCLOSURE

This patent describes the preparation of benzamides carrying amino and N(aromatic) groups in the ortho position with respect to each other. The patent also describes the preparation of poly(1-aromatic-2,5-benzimidazole) prepolymers and polymers useful in the manufacture of high-temperature adhesives, laminates, ablative materials, and other applications where strength retention is required under extreme conditions of heat and oxidation.

BACKGROUND OF THE INVENTION

Previously, it has been found that polybenzimidazoles can be prepared by the condensation of aromatic bis-o-diamines with aromatic dicarboxylic acid esters. It has also been proposed to prepare polybenzimidazoles by the homopolymerization of the so-called A–B monomers such as phenyl-(3,4-diamino)benzoate, H. Vogel et al., J. Poly. Sci., L, 511 (1961). Broadly speaking, the present invention is distinguished from the prior art in providing a new class of poly(1 - aromatic - 2,5 - benzimidazoles) prepolymers and polymers prepared from the corresponding A–B monomers.

The prior art, H. Vogel et al., J. Poly. Sci., 1(A) 1531 (1963) describes the preparation of N-phenyl-substituted polybenzimidazoles by the melt condensation of 1,3-dianilino - 4,6-diaminobenzene with diphenyl isothphalate. The resulting polymer possesses inferior thermal characteristics, probably due to the low purity of the 1,3-dianilino - 4,6-diaminobenzene. In general, we have found that the aromatic tetramines are sensitive to oxygen and light, and that in the N-phenyl substituted tetramines, this sensitivity is further accentuated. The deterioration of the aromatic tetramines upsets the stoichiometry, which is essential for good polymer preparation.

The preparation of the polybenzimidazoles by the A–B monomer route solves the problem of maintaining the desired stoichiometry. However, the preparation of poly-(2,5-benzimidazole) in accordance with Vogel et al. supra suffers from the disadvantage that over 49% of the A–B monomer is lost during the polymerization due to volatile evolution. The evolution of phenol during polymerization reduces the density of the final product since the formation of a substantial number of pores normally accompanies the evolution.

The present invention therefore is concerned with the preparation of a novel class of N-aromatic substituted polybenzimidazole prepolymers and polymers prepared from A–B monomers in which stoichiometry is accurately maintained and evolution of volatiles and its effects are avoided.

The field of the present invention is polybenzimidazole polymers, their method of preparation and their use.

SUMMARY OF THE INVENTION

Briefly, the present invention comprises novel polybenzimidazole polymers and prepolymers having the following recurring unit:

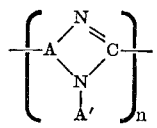

wherein A is a trifunctional aromatic group having carbon atoms available for completing the benzimidazole structure; A' is a monovalent aromatic group such as phenyl, tolyl, halophenyl and the like; and $n$ is an integer from about 10 to about 100,000. Preferably, A and A' contain from about 6 to about 13 carbon atoms.

The novel method of preparing these polymers and prepolymers comprises the homopolymerization of the A–B monomer having the following formula:

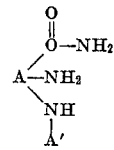

wherein A and A' are as defined above.

Accordingly, it is a principal object of the present invention to provide a novel class of polybenzimidazole prepolymers and polymers.

Another object of the present invention is to provide a novel method of preparing polybenzimidazole prepolymers and polymers.

Still another object of the present invention is the provision of a novel class of polybenzimidazole polymers possessing high thermal stability and freedom from pores.

Still another object of the present invention is to provide a method of preparing polybenzimidazole polymers wherein stoichiometry is accurately maintained and the evolution of phenol and the formation of pores is reduced.

In another aspect of the invention, it is an object thereof to provide a novel class of A–B monomers capable of polymerization to form improved polybenzimidazole polymers.

These and other objects and advantages of the present invention will become apparent from a more detailed description which follows:

DESCRIPTION OF THE PREFERRED EMBODIMENTS OF THE INVENTION

In general, the novel prepolymers of the present invention are soluble and fusible, generally have polymer melt temperatures below about 350° C. and inherent viscosities less than about 0.4. The degree of advancement at which the prepolymer becomes infusible can be readily determined for any given system by simple experimentation, such as by measuring the viscosity and the polymer melt temperature during the polymerization. The reaction is then terminated when the described values, consistent with the intended application, are achieved. Therefore, the technique for the isolation of the prepolymer of this invention need not be further detailed herein.

The polymerization of the A-B monomers of the present invention is normally conducted at a temperature from about 150° C. to about 300° C. The reaction ordinarily does not require the use of a solvent. However, the use of inert reaction solvents is permissible. In many cases, it is advantageous to conduct the polymerization reaction in an inert atmosphere such as in argon. The prepolymers produced by the process of the present invention may be isolated and purified in conventional manner, such as by washing, precipitation, and/or filtration.

The A-B monomers of the present invention are novel compounds and are prepared in accordance with the following general reaction equations:

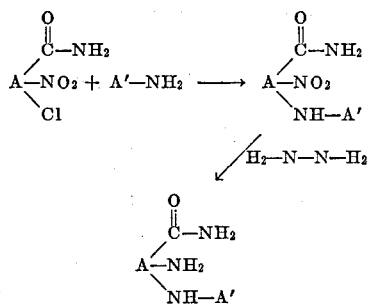

wherein A and A' are as defined above.

The following examples are presented solely to illustrate the invention and hence should not be considered limiting in any way. In the examples, the parts and percentages are by weight unless otherwise indicated.

EXAMPLE I

The preparation of 3-nitro-4-chlorobenzamide, 3-nitro-4-anilinobenzamide and 3-amino-4-anilinobenzamide 100 grams of 3-nitro-4-chlorobenzoic acid were heated under reflux and with good stirring with 200 ml. of thionyl chloride, the reaction being catalyzed with 5 ml. of dimethyl formamide. After five hours, the excess thionyl chloride was stripped off, the final traces being entrained with toluene. The resultant acid chloride was dissolved in toluene, treated with "Norite A" decolorizing charcoal and filtered. The toluene solution was poured directly into 1,000 ml. of concentrated ammonium hydroxide with vigorous stirring. The 3-nitro-4-chlorobenzamide separated in a high degree of purity and almost quantitative yield, and had a melting point of 155–156.5° C. 200 grams of 3-nitro-4-chlorobenzamide, 94 grams of aniline and 84 grams of sodium bicarbonate were mixed with 1000 ml. of water and heated with stiring under reflux for 24 hours. At the end of this time, all of the aniline had been consumed, and the orange product remained suspended in the water. Upon cooling, filtering, and washing with water, a 92% yield of analytically pure 3-nitro-4-anilinobenzamide was obtained having a melting point of 208–209.5° C.

*Analysis.*—Calc'd for $C_{13}H_{11}N_3O_3$ (percent): C, 60.70; H, 4.31; N, 16.34. Found (percent): C, 60.52; H, 4.38; N, 16.41.

125 grams of 3-nitro-4-anilinobenzamide was suspended in a mixture of 50 ml. of methanol with 70 ml. of 95% hydrazine, and the mixture was heated to 50° C. with good stirring in a 4000 ml. beaker. Raney nickel (0.1 gram) was added, and a vigorous exothermic reaction occured. The methanol which boiled out of the solution was replaced from time to time, and within 30 minutes the orange color of the starting material had disappeared. 5 grams of "Norite A" were then added and the mixture filtered under suction. Addition of water to the filtrate yielded a copious precipitate of 3-amino-4-anilinobenzamide. After one crystallization from aqueous methanol, analytically pure material was obtained in 85% yield having a melting point of 173–174° C.

*Analysis.*—Calc'd for $C_{13}H_{13}N_3O$ (percent): C, 68.71; H, 5.73; N, 18.50. Found (percent): C, 68.84; H, 5.94; N, 18.42.

The overall yield from 3-nitro-4-chlorobenzoic acid was 75%.

EXAMPLE II

Polymerization of 3-amino-4-anilinobenzamide to poly-(1-phenyl-2,5-benzimidazole)

The 3-amino-4-anilinobenzamide obtained in the foregoing example was melt polymerized at about 250° C. It was found that the polymerization reaction could be interrupted at any stage to yield a meltable prepolymer. The prepolymer could subsequently be advanced to the final stages of cure by further heating. The structure of the poly-(1-phenyl-2,5-benzimidazole) was confirmed by conventional analytical techniques. The polymer was found to possess outstanding resistance to oxidation. After exposure to air at 600° F. for 200 hours, a sample of this polymer had lost less than 8% of its original weight. No other known polybenzimidazole has retained so much of its original weight under similar conditions. The volatiles content of 3-amino-4-anilinobenzamide (in the form of ammonia and water) is only 15.4% which offers great processing advantages since there is less likelihood of entrained gases and bubbles in the final polymer product.

A sample of 3-amino-4-anilinobenzamide was left exposed to air and light for one month. At the end of this time, it had undergone only very slight discoloration and the elemental analysis failed to detect any substantial deterioration of the monomer. The monomer can therefore be prepared in large quantities and stored for considerable periods of time.

Many uses for the novel polymers of the present invention and their prepolymers will be immediately apparent to those skilled in the art. For example, the polymers may be utilized to prepare laminates which possess a higher density than the known polybenzimidazole laminates. Likewise, the polymers of this invention will be very useful in any high temperature application where stability for prolonged time periods is essential.

Having fully described the invention, it is intended that it be limited only by the lawful scope of the appended claims.

We claim:

1. Novel polybenzimidazole prepolymers having the repeating unit:

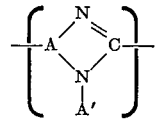

wherein A is a trifunctional carbocyclic aromatic group having carbon atoms available to complete the benzimidazole structure, A' is a monovalent carbocyclic aromatic group, and A and A' contain from 6 to about 13 carbon atoms.

2. The polymers of claim 1 having a melt temperature below about 350° C.

3. The polymers of claim 1 which have been advanced to an infusible state.

4. The method of preparing novel polybenzimidazole prepolymers which comprises homopolymerizing at a temperature of from about 150° C. to 300° C. an A-B monomer of the formula

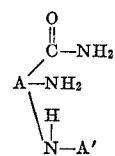

wherein A is a trifunctional carbocyclic aromatic group having carbon atoms available to complete the benzimidazole structure, A' is a monovalent carbocyclic aromatic group, and A and A' contain from 6 to about 13 carbon atoms.

5. The method of claim 4 wherein the polymerization is conducted in a melt.

6. The method of claim 4 wherein the polymerization is stopped short of infusibility.

7. The method of claim 4 wherein the polymerization is continued to yield an infusible polybenzimidazole polymer.

References Cited

UNITED STATES PATENTS 3,174,947   3/1965   Marvel et al. _____ 260—78

SAMUEL H. BLECH, Primary Examiner

U.S. Cl. X.R.

260—2, 558